(12) United States Patent
Hansen

(10) Patent No.: US 7,605,684 B2
(45) Date of Patent: Oct. 20, 2009

(54) METHOD AND APPARATUS FOR DETERMINING THE DIRECTION OF MOVEMENT OF RFID TAGS AND FOR CREATING CONSTANT-WIDTH INTERROGATION ZONES

(75) Inventor: Thorkild Hansen, Brighton, MA (US)

(73) Assignee: Seknion, Inc., Brighton, MA (US)

( * ) Notice: Subject to any disclaimer, the term of this patent is extended or adjusted under 35 U.S.C. 154(b) by 680 days.

(21) Appl. No.: 11/446,860

(22) Filed: Jun. 5, 2006

(65) Prior Publication Data
US 2007/0008071 A1  Jan. 11, 2007

Related U.S. Application Data

(60) Provisional application No. 60/687,681, filed on Jun. 6, 2005, provisional application No. 60/697,345, filed on Jul. 7, 2005.

(51) Int. Cl.
*H04Q 5/22* (2006.01)
*G08G 1/00* (2006.01)

(52) U.S. Cl. .................. 340/10.3; 340/10.34; 340/10.4; 340/10.5; 340/928; 340/905; 235/385; 235/493

(58) Field of Classification Search ................ 340/10.3, 340/10.34, 10.4, 901, 905, 928; 235/385, 235/493; 342/42
See application file for complete search history.

(56) References Cited

U.S. PATENT DOCUMENTS

| | | | |
|---|---|---|---|
| 5,128,669 A | | 7/1992 | Dadds et al. |
| 5,701,127 A | * | 12/1997 | Sharpe ...................... 340/10.2 |
| 5,900,825 A | * | 5/1999 | Pressel et al. ............... 340/905 |
| 6,653,946 B1 | | 11/2003 | Hassett |
| 6,661,352 B2 | | 12/2003 | Tiernay et al. |

OTHER PUBLICATIONS

International Search Report for International Application No. PCT/US06/21779 of Feb. 26, 2007.

* cited by examiner

*Primary Examiner*—Brian A Zimmerman
*Assistant Examiner*—Nam V Nguyen
(74) *Attorney, Agent, or Firm*—Fulbright & Jaworski

(57) ABSTRACT

The disclosed inventions relate to a method and apparatus for creating one-sided interrogation zones. The disclosed inventions further relate to a method and apparatus for determining the direction of movement of tagged items that pass by an RFID reader. The disclosed inventions also relate to a method and apparatus for combining one-sided interrogation zones of two or more antenna arrays to create an interrogation zone that maintains its width over a large range of distances.

22 Claims, 11 Drawing Sheets

METHOD AND APPARATUS FOR DETERMINING THE DIRECTION OF MOVEMENT OF RFID TAGS AND FOR CREATING CONSTANT-WIDTH INTERROGATION ZONES

CROSS-REFERENCE TO RELATED APPLICATIONS

This application claims the benefit of U.S. Provisional Application No. 60/687,681, filed Jun. 6, 2005, and U.S. Provisional Application No. 60/697,345, filed Jul. 7, 2005, each of which is hereby incorporated by reference in its entirety.

FIELD OF INVENTION

The invention relates to the interrogation of RFID tags. More particularly, the invention relates to the determination of direction of movement of RFID tags and to the creation of one-sided and constant-width interrogation zones.

BACKGROUND OF THE INVENTION

Radio Frequency Identification ("RFID") is a generic term for technologies that use radio waves to automatically identify individual items. Objects can be identified using RFID by storing a serial number that identifies the object on a chip that is attached to an antenna. The chip and the antenna together are called an RFID tag. An RFID reader sends out electromagnetic waves that are received by the antenna on the RFID tag. Passive RFID tags draw power from this electromagnetic field to power the chip. Active tags use their own batteries to power the chip. The tag responds to the reader by transmitting a bit stream to the reader that contains information about the tag (serial number, etc.). The current state of RFID technology is described in [1] K. Finkenzeller, "RFID Handbook" (John Wiley & Sons, 2003). Background information regarding the present disclosure may be found in [2] U.S. patent application Ser. No. 11/066,048, "Method and Apparatus for Improving the Efficiency and Accuracy of RFID Systems," filed Feb. 25, 2005, which is hereby incorporated by reference in its entirety.

RFID systems operate at many different frequencies. The most common frequencies are low frequencies around 135 KHz, high frequencies around 13.56 MHz, ultra-high frequencies around 900 MHz, and microwave frequencies around 2.45 GHz and 5.8 GHz.

Current RFID systems do not have well-defined interrogation zones, and tags in large regions are set off unintentionally. For example, a reader mounted on a forklift may unintentionally interrogate tags that are not on the pallet carried by the forklift, but attached to nearby stationary objects or even attached to items carried by another forklift. Moreover, current technology does not determine the direction of movement of tagged items that pass through an RFID portal. Hence, it is not known if an item that is read at a dock door entered or left the warehouse.

Reference [2] describes RFID readers that transmit data signals that cause the tags to respond and scramble signals that do not cause the tags to respond. The data and scramble signals are transmitted with different beams that are adjusted such that the scramble signals overshadow the data signals in all but selected regions. Hence, a tag will respond only if it is located in one of the selected regions, called the interrogation zones.

BRIEF SUMMARY OF THE INVENTION

One aspect of the present invention is directed to a method for interrogating RFID tags comprising transmitting a data beam that causes the tags to respond, transmitting one or more scramble beams that do not cause the tags to respond, and adjusting the data beam and the scramble beams such that the scramble beams overshadow the data beam everywhere except in a one-sided region.

Another aspect of the present invention is further directed to a method for determining the direction of movement of tagged items comprising interrogating tags with one-sided interrogation zones, and recording the order in which the tags are read in the one-sided interrogation zones. In one embodiment of the present invention, the direction of movement of the tagged items is determined using average read times for each of the one-sided interrogation zones.

The present invention is further directed to a method for interrogating RFID tags comprising transmitting a data beam that causes the tags to respond, transmitting one or more scramble beams that do not cause the tags to respond, and adjusting the data beam and the scramble beams such that the scramble beams overshadow the data beam everywhere except in a region that has approximately a constant width over a large range of distances from the reader. In one embodiment of the present invention, the constant-width region is obtained with two antenna arrays.

In one embodiment of the present invention, the excitation coefficients and time delays that create the desired interrogation zones are determined from the solution to an inverse source problem. In one embodiment of the present invention, the inverse source problem is solved with an iterative optimization scheme.

DETAILED DESCRIPTION

Figure 1:
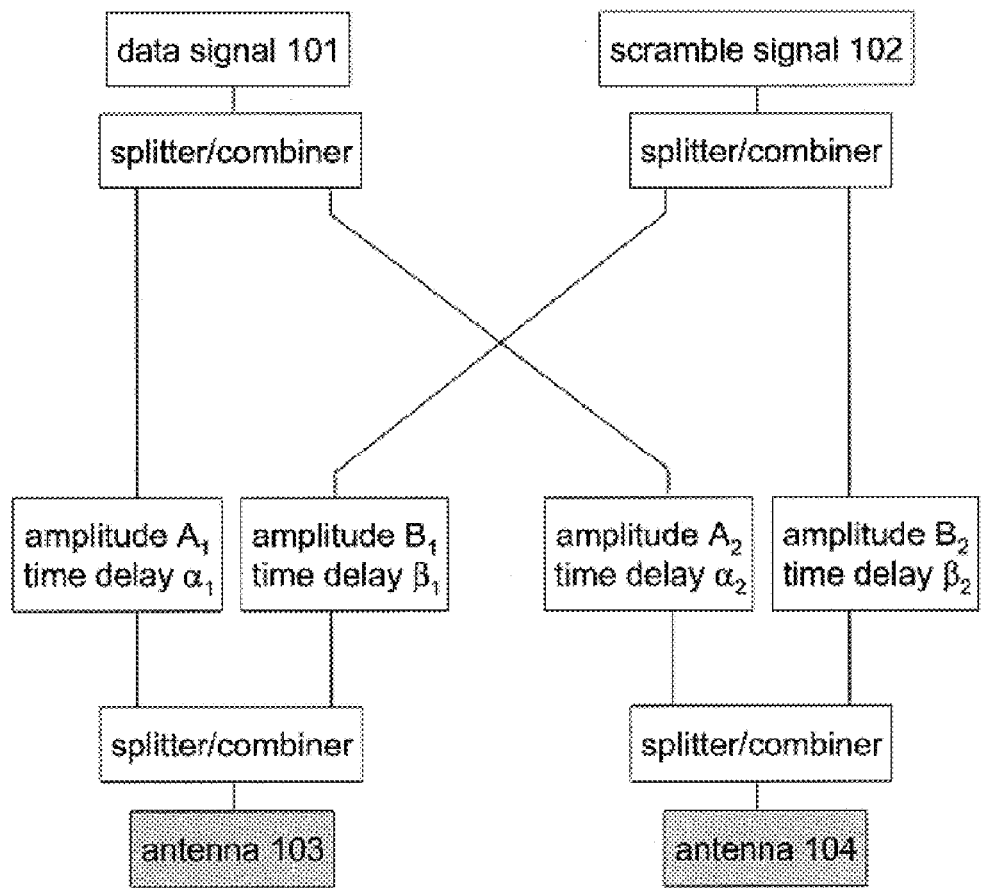
FIG. 1 illustrates a schematic of RF control electronics for a two-element array. Each antenna element is driven by a linear combination of two RF signals: a data signal and a scramble signal. The beam patterns for each signal are determined by the weighting coefficients $A_1$, $A_2$, $B_1$, and $B_2$. The time delays $\alpha_1$, $\alpha_2$, $\beta_1$, and $\beta_2$ steer the beams in specific directions.

One aspect of the present invention provides for the creation and employment of one-sided interrogation zones for determining the direction of movement of a tagged item that passes by an RFID reader. Also provided is a method by which combinations of one-sided interrogation zones of two or more readers can create a combined interrogation zone that maintains its width over an extended range of distances from the readers. As in [2], the reader broadcasts the following two types of signals:

1. A data signal that causes the tags to respond. The data signal may instruct the tags to broadcast or modify stored information. The data signal may contain information about scan angles that the tags can retransmit back to the reader. Also, the data signal may employ any of the methods developed to solve the problem of a tag collision that occurs when two or more tags transmit simultaneously [1, Chapter 7].
2. One or more scramble signals that do not cause the tags to respond. The tags neither broadcast nor modify their stored information. A pure sine wave works as a scramble signal for UHF tags. The scramble signals can be used to charge the tags and to convey a separate intelligible information stream. The scramble signal can also be referred to as a guard signal. Methods for generating scramble signals are described in U.S. Provisional Application No. 60/697,345, filed Jul. 7, 2005.

A reader is said to employ information steering when it transmits both data and scramble signals. Aspects of the present invention make extensive use of antenna arrays. The following references describe the theory and design of phased arrays: R. C. Hansen, "Phased Array Antennas," John Wiley & Sons, 1998; R. J. Mailloux, "Phased Array Antenna Handbook," Artech House, 1994; and, R. S. Elliot, "Antenna Theory and Design," IEEE Press, 2003. With adaptive phased arrays, also known as. smart antennas, the received signals and environmental parameters are fed to powerful processors that steer the beams to optimize performance. The technology for designing and constructing adaptive phased arrays with hundreds of elements that produce prescribed sum and difference patterns has reached a mature stage, as described in the following references: M. I. Skolnik, "Radar Handbook," McGraw-Hill, 1990, 2nd edition; R. T. Compton, "Adaptive Antennas," Prentice-Hall, 1998; and, G. V. Tsoulos, ed., "Adaptive Antennas for Wireless Communications," IEEE Press, 2001.

Consider an array with N elements that can be fed individually with different input signals. In standard operation, one would feed array element #p with a signal of the form:

$$T_p(t) = A_p a(t - \alpha_p),$$

where a(t) is a data time signal. Generally, one could feed each array element with time functions that have different time dependences to compensate for array imperfections, end-element effects, or array elements differences. Such adjustments would be well known and straightforward to those working in this area. Therefore, it is assumed presently that the time dependence of each input signal is the same (the amplitudes and time delays are different). The array excitation coefficients and time delays are determined by standard methods to achieve a desired radiation pattern of the array that adapts to its environment.

The controlled interrogation zone is obtained with the present invention by feeding each element with a total signal that is obtained by adding at least one scramble signal to the data signal. In the case of one scramble signal b(t), the total input signal to array element #p is:

$$T_p(t) = A_p a(t - \alpha_p) + B_p b(t - \beta_p).$$

It was disclosed in [2] how the parameters $A_p$, $B_p$, $+_p$, and $\beta_p$ can be adjusted to create user-defined interrogation zones; in particular, it was demonstrated how to create narrow interrogation zones. Certain two-dimensional arrays (such as planar and cylindrical arrays) require two scramble signals to achieve the desired interrogation zones [2].

It will now be demonstrated by an example involving a two-element array how a combination of data and scramble signals can create a one-sided interrogation zone. Those of skill in the art will recognize that this example is equally applicable to the creation of one-sided interrogation zones with other types of arrays, such as general linear arrays, ring arrays, planar arrays, and cylindrical arrays. The analytic and numerical array-synthesis techniques described in [2] are also applicable here. In particular, the excitation coefficients and time shifts can be determined from the solution to inverse source problems, which in turn can be solved with iterative optimization schemes [2].

The following numerical examples involve z-directed patch antennas and dielectric walls that can be analyzed using the standard methods in wave propagation and scattering (see for example, C. A. Balanis, "Advanced Engineering Electromagnetics," John Wiley & Sons, 1998). The primary field radiated by a z-directed patch antenna is computed in the x-y plane as the product of the field of a z-directed Hertzian dipole and the factor (1+cos(v)), where v is the angle between the element normal and the observation point. The walls are modeled by homogeneous half spaces and the reflections are computed from Geometrical Optics using the Fresnel reflection coefficients.

The field is first computed in the x-y plane for each antenna element excited by a unit-amplitude 900 MHz signal. If walls are present, this computation includes the reflected field. The appropriate array-excitation coefficient and time shift are subsequently applied to the individual fields. Finally, the results are added to get the total field of the array in the x-y plane. The field computations are almost instantaneous, so the fields can be rapidly computed for a large selection of excitation coefficients. Hence, optimal array excitation coefficients that create the desired interrogation zones can be rapidly computed by standard trial-and-error techniques or by using non-linear optimization schemes (see, for example, P. Venkataraman, "Applied Optimization with MATLAB Programming," Wiley, 2001).

One-Sided RFID Interrogation Zones

FIG. 1 shows the schematic of RF control electronics for a two-element array. Each antenna element 103 and 104 is driven by a linear combination of two RF signals: a data signal 101 and a scramble signal 102. The beam patterns for each signal are determined by the weighting coefficients $A_1$, $A_2$, $B_1$, and $B_2$, and the time delays $\alpha_1$, $\alpha_2$, $\beta_1$, and $\beta_2$. Beam steering is achieved by assigning nonzero values to the time delays, which result in the complex excitation coefficients $A_p \exp(i 2\pi f_0 \alpha_p)$ and $B_p \exp(i 2\pi f_0 \beta_p)$ for p=1 and 2, when the exp(−i2πf₀t) time dependence is suppressed and $f_o$ is the frequency at which the pattern is evaluated. These issues are well known to those working in this area.

Figure 2A:
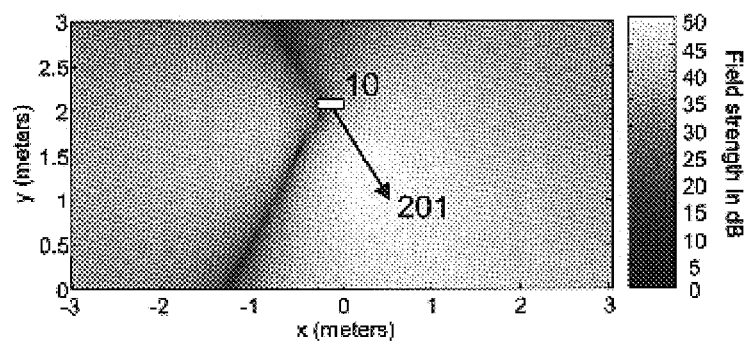
FIGS. 2A/B illustrate free-space signal strength of data beam (2A) and scramble beam (2B).
Figure 2B:
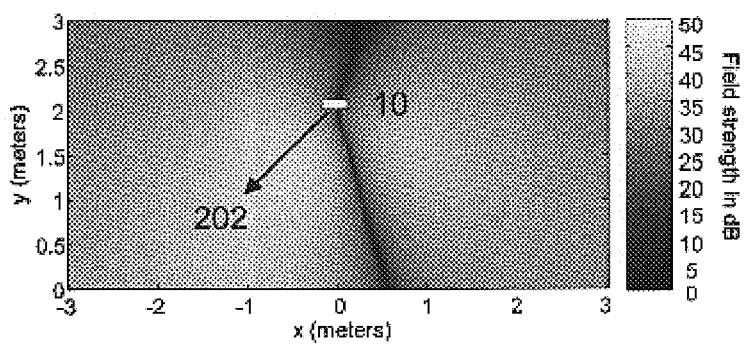

FIGS. 2A/B show the free-space field distributions in the x-y plane when the array elements in antenna array 10 in this example are patch antennas with (1+cos(v)) patterns, where v is the angle between the element normal and the observation point in the x-y plane, displaying the strength of the data beam (FIG. 2A) and the scramble beam (FIG. 2B). (See R. J. Mailloux, "Phased Array Antenna Handbook," Artech House, 1994, Chapter 4.) The two array elements are located at (x, y, z)=(−8.33 cm, 2 m, 0) and (x, y, z)=(8.33 cm, 2 m, 0), with element normals pointing in the −y direction. The antennas operate at 900 MHz with weighting coefficients $A_1=A_2=0.4733$ and $B_1=B_2=0.2367$. The time delays $\alpha_p$ for p=1 and 2 steer the data beam 30° to the right as indicated by arrow 201 in FIG. 2A, and the time delays $\beta_p$ for p=1 and 2 steer the scramble beam 45° to the left as indicated by arrow 202 in FIG. 2B.

Figure 3A:
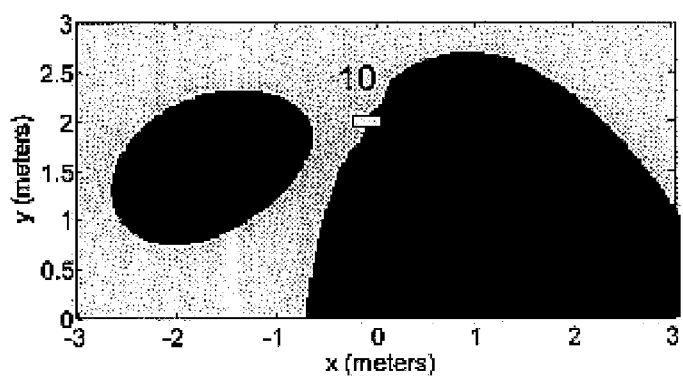
FIGS. 3A/B illustrate interrogation zones of data beam (3A) and of combined data and scramble beams (3B).
Figure 3B:
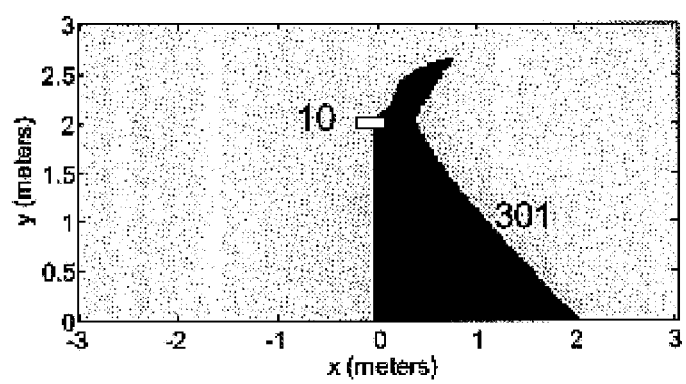

Assume that the power level of the data signal is adjusted so that tags in the broadside direction at a distance of 10 m receive just enough power to function, and that the modulated scattering from these tags can be correctly understood by the reader. The plot in FIG. 3A shows the tag interrogation zone achieved with a reader that broadcasts only the data signal. All tags at the edge of the interrogation zone receive just enough power to function. Tags outside the interrogation zone do not receive enough power. The plot in FIG. 3B shows the one-sided interrogation zone obtained when the reader broadcasts both data and scramble signals.

For a tag to function in this mode of operation, it must be in a location where two conditions are met: (1) the power of the data signal is sufficient to set off a tag and (2) the data signal overshadows the scramble signal (the data signal is at least 10 dB larger than the scramble signal in shaded area 301 of the plot in FIG. 3B; this 10 dB threshold is an arbitrary figure chosen for illustration purposes only, the actual threshold will depend on the particular system being used). The interrogation zone obtained with information steering is one-sided and confined to the half space x>0. Moreover, this property of the interrogation zone is independent of the power levels of the signals, provided the ratio of the scramble signal power and data signal power is kept constant.

Figure 4A:
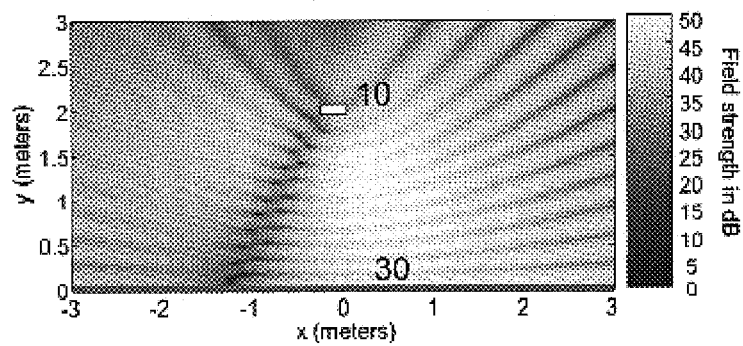
FIGS. 4A/B illustrate total signal strength of the data beam (4A) and the scramble beam (4B) when the beams are broadcast toward a concrete wall.
Figure 4B:
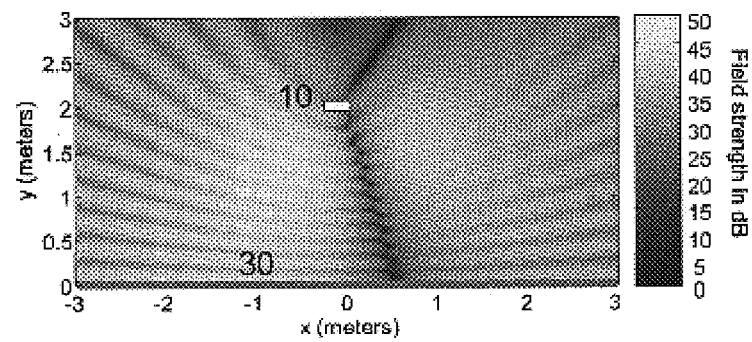
Figure 5A:
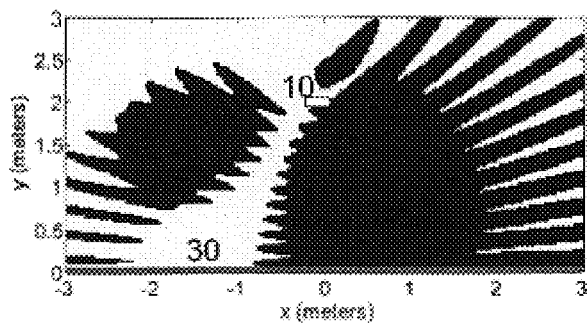
FIGS. 5A/B/C illustrate interrogation zones of data beam (5A) and of combined data and scramble beams (5B/C) when the reader broadcasts toward a concrete wall and a conveyer belt.
Figure 5B:
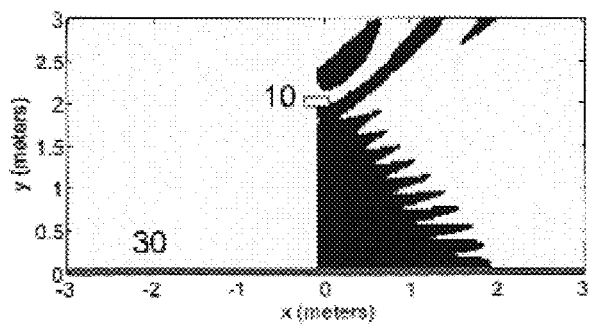

A concrete wall 30 with a relative permittivity of 6 and a conductivity of 0.05 S/m is now placed 2 m from the reader. FIGS. 4A/B show the total field distributions (direct field plus reflected field) for the data and scramble signals. More specifically, FIGS. 4A/B show the total signal strength of the data beam (FIG. 4A) and the scramble beam (FIG. 4B) when the beams are broadcast toward a concrete wall. The field distributions have ripples (peaks and nulls) that result from the direct and reflected fields being in and out of phase. Close to the reader, however, the direct field dominates. FIGS. 5A/B show the interrogation zones based on the same value for the required power level that was used in FIGS. 3A/B. The interrogation zone of the data signal alone (FIG. 5A) has widened because the reflected field from the wall 30 can set off additional tags. The interrogation zone achieved by broadcasting both data and scramble signals (FIG. 5B) is again one-sided and confined to the half space x>0. This example illustrates that the two-element reader can create a one-sided interrogation zone in a multipath environment.

Figure 5C:
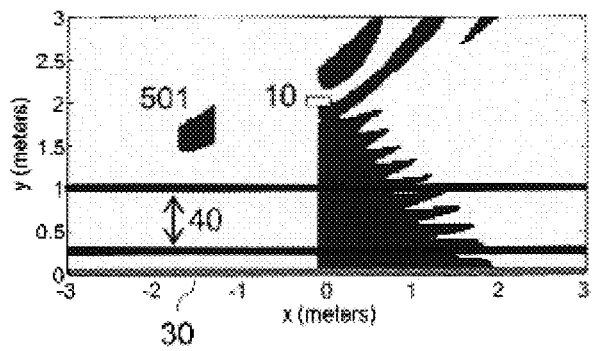

FIG. 5C illustrates a possible interrogation zone when conveyer belt 40 is placed between antenna array 10 and concrete wall 30. Portion 501 of the interrogation zone is in the region x<0. Portion 501 does not reach conveyer belt 40. Hence, for items on conveyer belt 40, the interrogation zone in FIG. 5C is one-sided and confined to the region x>0. This example illustrates a situation of practical importance. Interrogation zones can be one-sided for certain regions of space (conveyer belt 40 in the above example) without being one-side for the entire space. In this application, the term "one-sided interrogation zone" refers to such interrogation zones that are one-sided in selected regions without necessarily being one-sided throughout space.

Figure 6:
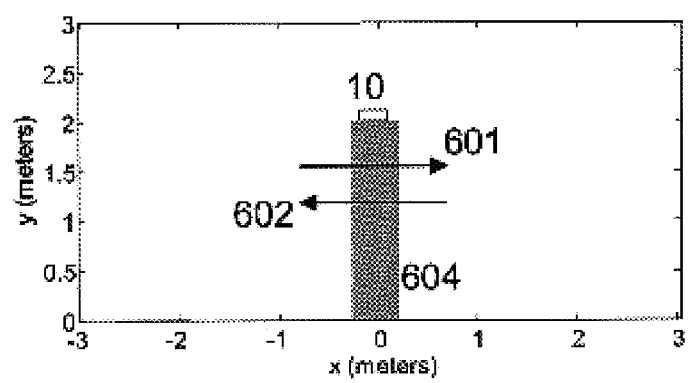
FIG. 6 illustrates the movement of tagged items through the interrogation zone of the reader.
Figure 7A:
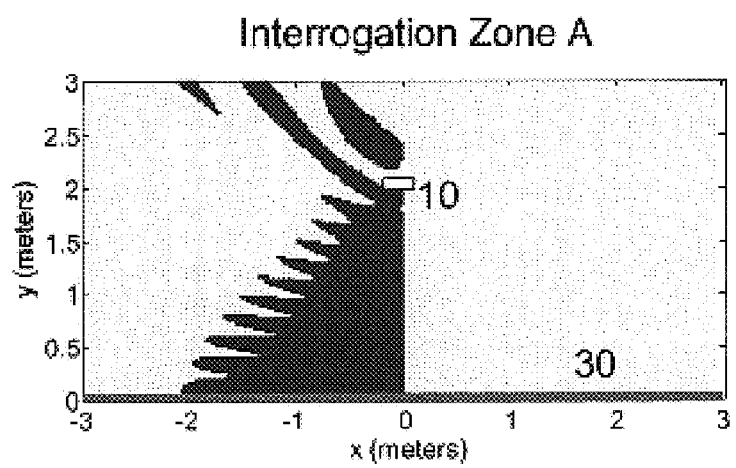
FIGS. 7A/B illustrate two one-sided interrogation zones of combined data and scramble beams when the reader broadcasts toward a concrete wall. Interrogation Zone A is shown in FIG. 7A, and Interrogation Zone B is shown in FIG. 7B.
Figure 7B:
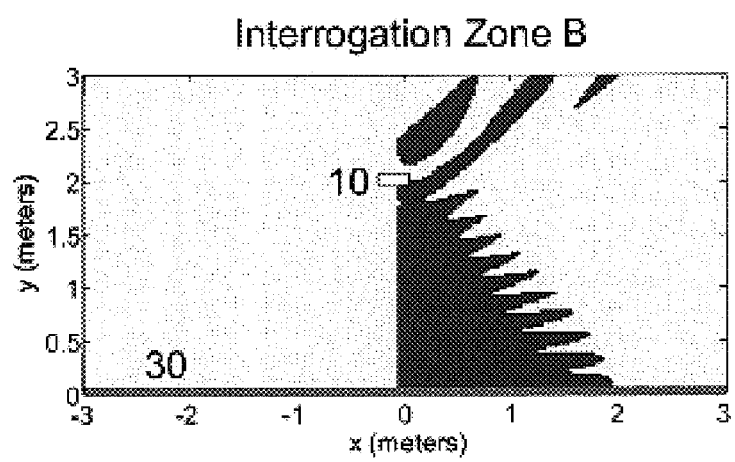

Determining the Direction of Movement of a Tagged Item Using One-Sided Interrogation Zones The one-sided interrogation zone achieved by broadcasting both data and scramble signals can be used with a decision algorithm to determine which way a tagged items passes through the interrogation zone 603 of the reader. FIG. 6 shows how tagged items pass through zone 604 by the reader either from left to right (arrow 601) or from right to left (arrow 602) past two-element array 10. By electronically switching the antennas or by changing the steering angles of the data and scramble beams, the two one-sided interrogation zones in FIGS. 7A/B can be achieved. The Interrogation Zone A in FIG. 7A can be obtained by steering the data beam 30° to the left and the scramble beam 45° to the right. The Interrogation Zone B in FIG. 7B is identical to the interrogation zone in FIG. 5B. The direction of movement of a tagged item can now be determined by the following procedure.

The reader switches between interrogation zones A and B at least once as a tagged item passes by, so that the item is read at least one time in each interrogation zone. From the shape of the two interrogation zones it follows that the item moves from left to right if it is read in interrogation zone A before it is read in interrogation zone B. Similarly, the item moves from right to left if it is read in interrogation zone B before it is read in interrogation zone A.

Average read times can be computed for the two interrogation zones if a tagged item is read more than once in each of the two one-sided interrogation zones. For example, if a tagged item is read in interrogation zone A at 10:40:45 AM and at 10:40:47 AM, the corresponding average read time would be 10:40:46 AM. The direction of movement can be determined from the average read times as follows. The item moves from left to right if the average read time for interrogation zone A occurs before the average read time for interrogation zone B. Similarly, the item moves from right to left if the average read time for interrogation zone A occurs after the average read time for interrogation zone B.

Interrogation Zones A and B in FIG. 7 were used here to determine the direction of movement of tagged items. Those of skill in the art will recognize that the method described by this example can be applied to any two or more interrogation zones that are one-sided.

Constant-Width Interrogation Zones

For certain applications it is desirable to have an interrogation zone with a constant width over a large area. As will now be demonstrated through an example, such an interrogation zone can be obtained by employing two two-element arrays (10 and 20 in FIGS. 8-11). Based on this example, a person skilled in the art of array synthesis can create constant-width interrogation zones with general arrays by using the analytic or numerical arrays synthesis techniques described in [2].

Each of the two-element arrays 10 and 20 in the example employs the RF control electronics in FIG. 1. The antenna elements are patch antennas with (1+cos(v)) patterns, where v is the angle between the patch normal and the observation point in the x-y plane. The antennas operate at 900 MHz and the arrays are 1 meter apart with the patch normals pointing in the −y direction. The array elements for Array 10 are at (x, y, z)=(−0.5833 m, 4 m, 0) and (x, y, z)=(−0.4167 m, 4 m, 0). The array elements for Array 20 are at (x, y, z)=(0.4167 m, 4 m, 0) and (x, y, z)=(0.5833 m, 4 m, 0).

Figure 8A:
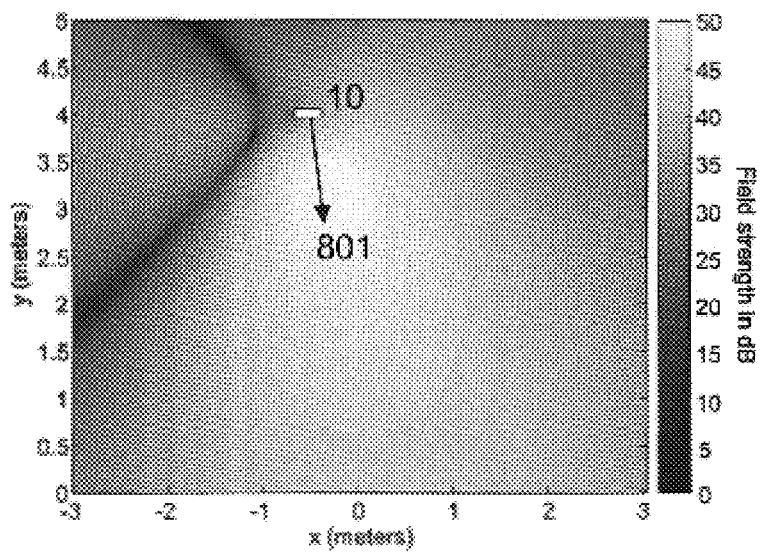
FIGS. 8A/B illustrate free-space signal strength of data beam (8A) and scramble beam (8B) for Array 10.
Figure 8B:
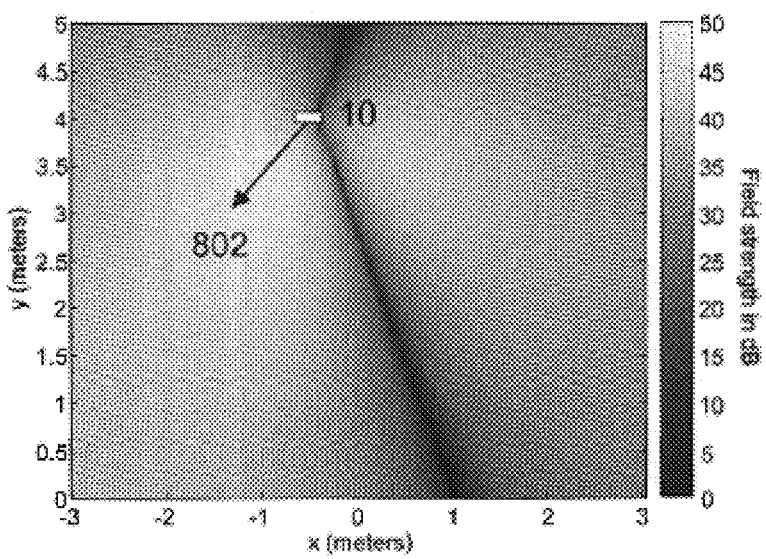

Array 10 interrogates with weighting coefficients $A_1=A_2=0.4733$ for the data beam and $B_1=B_2=0.3571$ for the scramble beam. As shown in FIGS. 8A/B, time delays steer the data beam 15° to the right (arrow 801 in FIG. 8A) and the scramble beam 40° to the left (arrow 802 in FIG. 8B), where the data and scramble field strengths are shown. Array 20 broadcasts only a scramble beam steered 45° to the right with coefficients $B_1=B_2=0.4048$ as shown by arrow 901 in FIG. 9.

Figure 9:
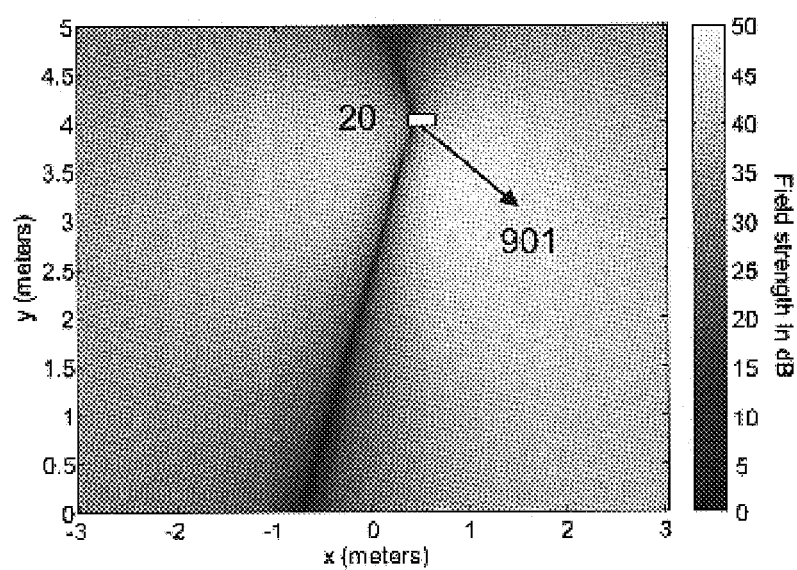
FIG. 9 illustrates free-space signal strength of the scramble beam for Array 20.
Figure 10A:
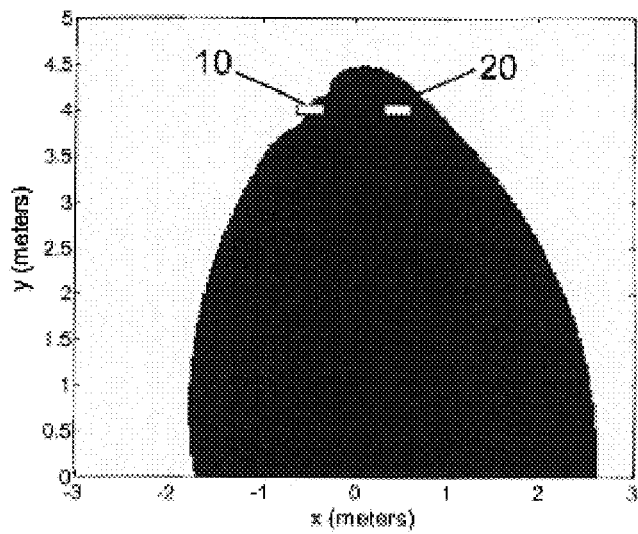
FIGS. 10A/B illustrate interrogation zones of the data beam of Array 10 (10A) and of the combined data and scramble beams of both Array 10 and Array 20 (10B).
Figure 10B:
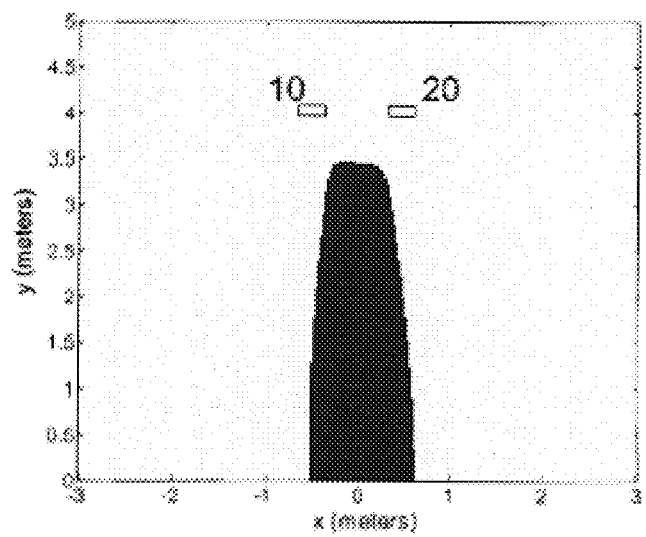
Figure 11A:
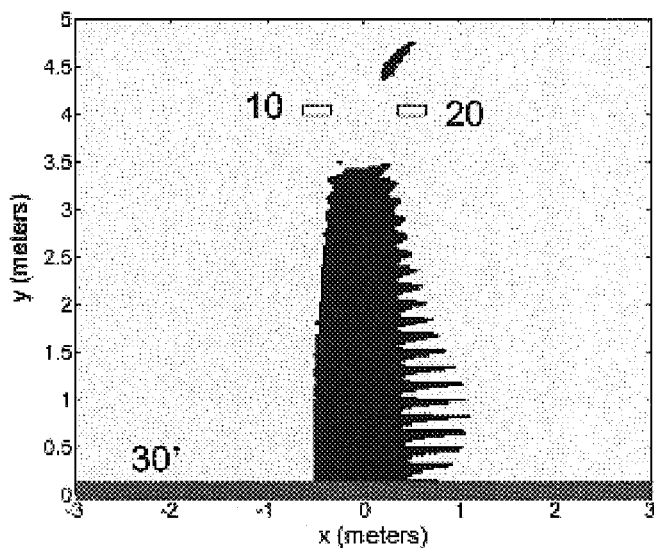
FIGS. 11A/B illustrate interrogation zones of combined data and scramble beams when the reader broadcasts toward a concrete wall located 4 meters away (11A) and 2 meters away (11B).
Figure 11B:
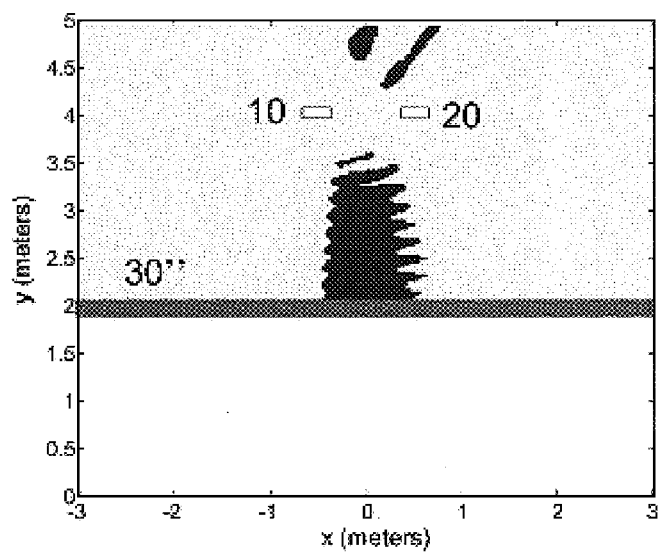

As before, the power level of the data signal is adjusted so that tags in the broadside direction at a distance of 10 m receive just enough power to function, and that the modulated scattering from these tags can be correctly understood by the reader. The plot in FIG. 10A shows the tag interrogation zone achieved when only the data signal of Array 10 in FIG. 8A is present. The plot in FIG. 10B shows the interrogation zone obtained when the data and scramble signals in FIGS. 8A/B and FIG. 9 are broadcast and the two scramble signals are independent. For a tag to function in this mode of operation, it must be in a location where two conditions are met: (1) the power of the data signal is sufficient to set off a tag, and (2) the data signal overshadows the total scramble signal by at least 10 dB; this 10 dB threshold is an arbitrary figure chosen for illustration purposes only, the actual threshold will depend on the particular system being used. The interrogation zone obtained by combining one data signal with two scramble signals is approximately 1 meter wide over a 3.5-meter range.

Next, concrete walls 30' and 30" with relative permittivity of 6 and conductivity of 0.05 S/m are placed 4 meters (FIG. 11A) and 2 meters (FIG. 11B) in front of the reader. The resulting interrogation zones in FIG. 11 have widths of about one meter at the locations of both walls. Hence, if this reader is placed on a moving vehicle, only tags in a one-meter wide zone will be interrogated as the vehicle approaches the wall. This type of interrogation zone can be useful for forklift applications where it is desirable that a reader mounted on the forklift interrogates only tags on the pallet that is directly in front of the forklift.

CONCLUSION

Although the present invention and its advantages have been described in detail, it should be understood that various changes, substitutions, and alterations can be made herein without departing from the invention as defined by the appended claims. Moreover, the scope of the present application is not intended to be limited to the particular embodiments described in the specification. As one of skill in the art will readily appreciate from the disclosure, other processes or systems presently existing or later to be developed may be used. Accordingly, the appended claims are intended to include within their scope other such processes and systems.

What is claimed is:

1. A method for interrogating an RFID tag using an antenna array, comprising the steps of:

transmitting a data signal having an amplitude and a time delay, wherein said data signal causes said RFID tag to respond to said antenna array;

transmitting one or more scramble signals each having an amplitude and a time delay, wherein said one or more scramble signals do not cause said RFID tag to respond to said antenna array;

selecting said data signal amplitude, said data signal time delay, said one or more scramble signal amplitudes, and said one or more scramble signal time delays so that said data signal overshadows said one or more scramble signals in a region and said one or more scramble signals overshadow said data signal outside said region, wherein said region is a one-sided region; and, receiving a response from said RFID tag when said RFID tag is located within said region.

2. The method of claim 1, wherein said one or more scramble signals comprise a plurality of scramble signals.

3. The method of claim 2, wherein said antenna array is a planar array.

4. The method of claim 2, wherein said antenna array is a cylindrical array.

5. The method of claim 1, wherein said antenna array is a two-element array.

6. The method of claim 1, wherein said antenna array is a linear array.

7. The method of claim 1, wherein said antenna array is a ring array.

8. The method of claim 1, wherein said selecting step further comprises determining the solution to an inverse source problem.

9. The method of claim 8 wherein said inverse source problem is solved with an iterative optimization scheme.

10. A method for determining the direction of movement of an RFID tag using an antenna array, comprising the steps of:

providing a data signal;

providing a scramble signal;

creating during a first time interval a first one-sided region in which said data signal overshadows said scramble signal;

creating during a second time interval a second one-sided region in which said data signal overshadows said scramble signal;

determining a first response of said RFID tag during said first time interval while said RFID tag is within said first one-sided region;

determining a second response of said RFID tag during said second time interval while said RFID tag is within said second one-sided region; and, determining the direction of movement of said RFID tag based on the temporal order of said first response and said second response.

11. The method of claim 10 wherein said first response and said second response are determined based on an average of responses by said RFID tag.

12. The method of claim 10 wherein said creating steps further comprise electronically switching antenna elements in said antenna array.

13. The method of claim 10 wherein said creating steps further comprise steering antenna elements in said antenna array.

14. A method for interrogating an RFID tag, comprising the steps of:

providing a first antenna array;

providing a second antenna array;

transmitting a data signal having an amplitude and a time delay, wherein said data signal causes said RFID tag to respond to said first antenna array;

transmitting a plurality of scramble signals each having an amplitude and a time delay, wherein said plurality of scramble signals does not cause said RFID tag to respond with said first antenna array or said second antenna array;

selecting said amplitude of said data signal, said amplitudes of said plurality of scramble signals, said time delay of said data signal, and said time delays of said plurality of scramble signals so that said data signal overshadows said plurality of scramble signals in a region and said plurality of scramble signals overshadows said data signal outside said region, wherein said region is a region of constant width; and, receiving a response from said RFID tag when said RFID tag is located within said region.

15. The method of claim 14 wherein said plurality of scramble signals overshadow said data signal by at least 10 dB in said region.

16. An apparatus for interrogating an RFID tag, comprising:

an antenna array;

a transmitter that transmits a data signal having an amplitude and a time delay, wherein said data signal causes said RFID tag to respond to said antenna array;

a transmitter that transmits one or more scramble signals each having an amplitude and a time delay, wherein said one or more scramble signals do not cause said RFID tag to respond to said antenna array;

a processor that selects said data signal amplitude, said data signal time delay, said one or more scramble signal amplitudes, and said one or more scramble signal time delays so that said data signal overshadows said one or more scramble signals in a region and said one or more scramble signals overshadow said data signal outside said region, wherein said region is a one-sided region; and, a receiver that receives a response from said RFID tag to said data signal when said RFID tag is located inside said region.

17. The apparatus of claim 16, wherein said one or more scramble signals comprise a plurality of scramble signals.

18. The apparatus of claim 17, wherein said antenna array is a planar array.

19. The apparatus of claim 17, wherein said antenna array is a cylindrical array.

20. The apparatus of claim 16, wherein said antenna array is a two-element array.

21. The apparatus of claim 16, wherein said antenna array is a linear array.

22. The apparatus of claim 16, wherein said antenna array is a ring array.

* * * * *

UNITED STATES PATENT AND TRADEMARK OFFICE
CERTIFICATE OF CORRECTION

PATENT NO.        : 7,605,684 B2
APPLICATION NO.   : 11/446860
DATED             : October 20, 2009
INVENTOR(S)       : Thorkild Hansen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this

Fifth Day of October, 2010

David J. Kappos
*Director of the United States Patent and Trademark Office*